No. 635,623. Patented Oct. 24, 1899.
F. C. WEBER.
CART.
(Application filed Mar. 8, 1899.)

(No Model.) 2 Sheets—Sheet 1.

Witnesses:
M. F. Daly
I. Johnson.

Inventor:
Frederick C. Weber
By Arden S. Fitch
atty.

No. 635,623. Patented Oct. 24, 1899.
F. C. WEBER.
CART.
(Application filed Mar. 8, 1899.)
(No Model.) 2 Sheets—Sheet 2.
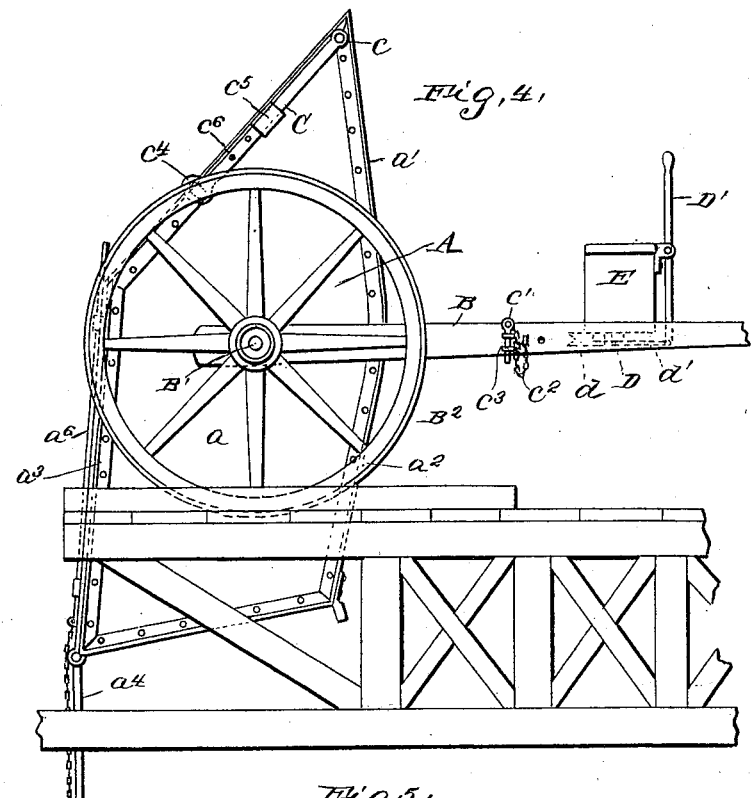
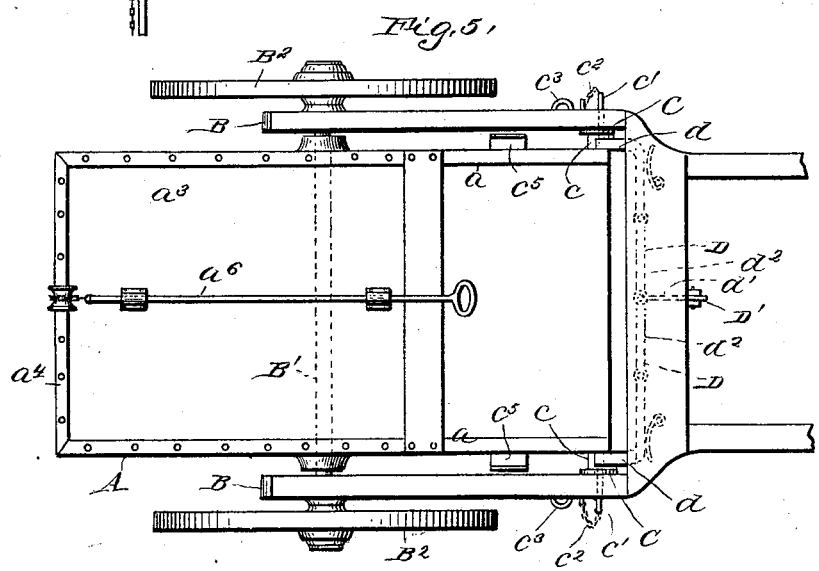
Witnesses:
M. F. Daly
J. Johnson.
Inventor:
Frederick C. Weber
By Arden J. Fitch
Atty.

UNITED STATES PATENT OFFICE.

FREDERICK C. WEBER, OF NEW YORK, N. Y.

CART.

SPECIFICATION forming part of Letters Patent No. 635,623, dated October 24, 1899.

Application filed March 8, 1899. Serial No. 708,176. (No model.)

*To all whom it may concern:*

Be it known that I, FREDERICK C. WEBER, a citizen of the United States, residing in the city of New York, county of New York, State of New York, have invented certain new and useful Improvements in Carts, of which the following is a full, clear, and exact description, reference being had to the accompanying drawings, forming part of this specification.

My invention particularly relates to dumping-carts; and the object of my invention primarily is to provide a dumping-cart the body of which is so shaped and so pivoted in the cart-frame that when the body is adjusted and rigidly held in such adjusted position in the frame the said body will be capable of automatically taking up its load while the cart is drawn forward on its wheels; and the further objects of my invention are to provide means for the convenient and rapid adjustment of the body on its pivot in the frame and for holding the body rigidly in its adjusted position and also to facilitate the easy operation of the cart-body in dumping.

My invention consists, primarily, in the combination, in a dumping-cart, with the frame, axle, and wheels thereof, of a body pivotally mounted on the axle and open at its forward end and with the forward portion of its bottom inclined between the rearward portion thereof and said open front end, whereby when the forward end of the cart is brought downward in the frame by swinging the body in said direction on the axle the forward portion of said body with its said inclined bottom will operate as a scoop to gather and throw upwardly and rearwardly into the body any soft or granular substance—such as sand, gravel, coal, or snow—which may be on the ground over which the cart is drawn; and my invention also comprises means for rigidly holding the body in desired adjustment in the frame and for facilitating the general operation of the cart, as hereinafter particularly set forth.

Figure 1:
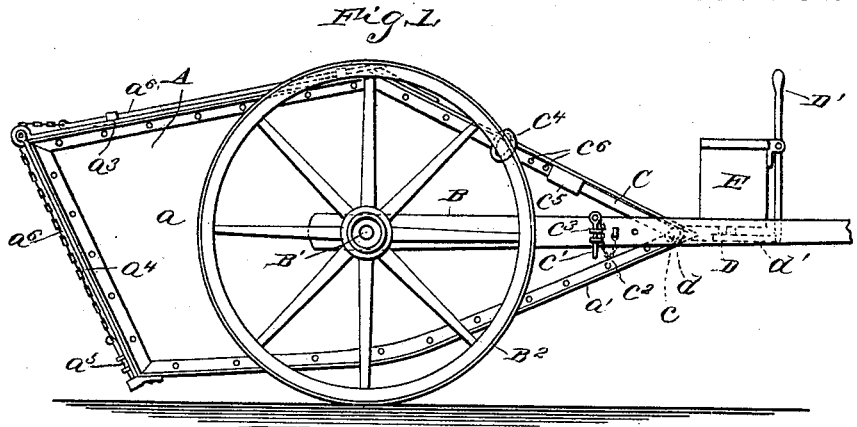
Figure 2:
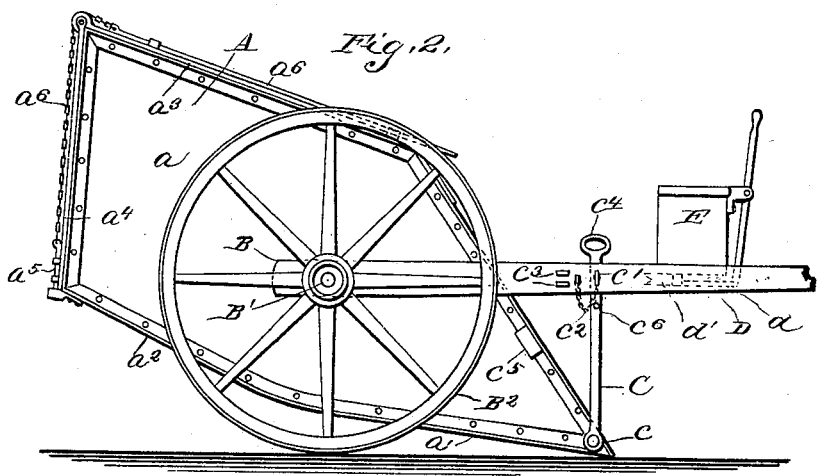
Figure 3:
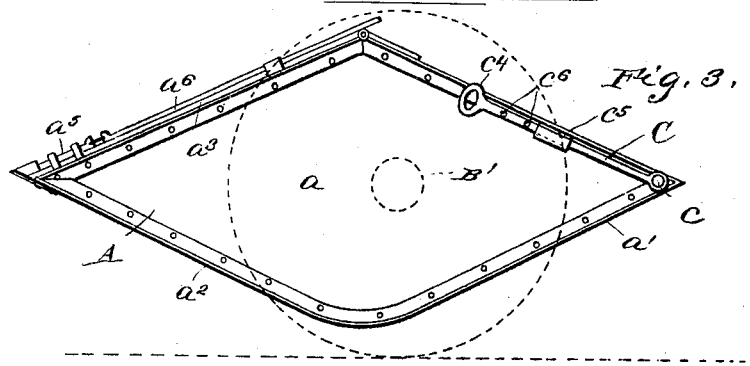

In the drawings, Figure 1 is a side elevation of a cart containing my invention and with the parts adjusted in position for draft. Fig. 2 is a similar view of the same, showing the body rigidly held in adjustment for gathering a load. Fig. 3 is a similar view of the body in detail, showing a modified form thereof. Fig. 4 is a similar view of the cart in the act of dumping, and Fig. 5 is a plan of the cart in the position shown in Fig. 2.

A is the body of the cart. B is the frame; B', the axle upon which the frame is mounted, and B² the wheels.

The body A is pivotally mounted on the axle B' within the frame B and is composed of the side walls $a$ and a bottom, the forward portion $a'$ of which and preferably from a lateral line below and parallel to the axle is inclined, desirably, at a wide angle between the rearward portion of said bottom, as at $a^2$, and the front open end of the body. The rearward portion $a^2$ of said body-bottom may be approximately parallel to the top or lid $a^3$ of the body, which lid is preferably provided to close the upper part of the body, as illustrated in Figs. 1, 2, and 4, or said rearward portion $a^2$ of the body may be inclined from the aforesaid line reversely to and approximately in the same degree as the forward portion $a'$ of the bottom, so as to meet the lid $a^3$ at an acute angle, as illustrated in Fig. 3. When the body is constructed as shown and described in Figs. 1, 2, and 4, the back of the body is closed by a gate $a^4$, hinged to the rearward edge of the lid, and when said body is constructed as shown and described in Fig. 3 the lid $a^3$ is itself hinged to the side walls at its forward edge, as illustrated. The upper edges of the forward portion of the side walls $a$ are preferably inclined downward from the lid to the front edge of the forward portion of the bottom $a'$, and the front of the body between the side walls $a$, lid $a^3$, and forward portion $a'$ of the bottom is open, as illustrated.

In the form of body shown and described in Figs. 1, 2, and 4 the greater cubic space for holding a load will be to the rearward of the pivotal mounting thereof on the axle, so that the tendency of the body unless restrained when loaded will be to tilt rearwardly, as in dumping. This tendency of the body is desirable in a dumping-cart, as it facilitates the operation of dumping, and to promote a similar tendency in the body when the same is formed as shown and described in Fig. 3 it is desirable that the body be pivotally mounted on the axle at points somewhat forward of the center of gravity of the body, as illustrated in Fig. 3.

It is apparent that the described body A may be tilted forward until the forward edge of the inclined portion $a'$ of the bottom more or less closely approaches the surface of the ground, as shown in Fig. 2, and that being held rigidly in said position when the cart is drawn forward over the ground the front open end and said inclined bottom $a'$ of the body will operate as a scoop to gather material from the ground-surface and force it upwardly into the rearward portion of the body, thereby automatically loading the body as the cart is drawn forward. When the body has been filled with material thus gathered, it may be tilted rearwardly, its described tendency to do so assisting in this operation until the forward edge of the inclined portion $a'$ of the bottom is raised to a level with the frame, when upon securing the body in such position in the frame the load may be drawn to the dump.

In carrying out my invention I combine with the described body A and the frame B means carried by one of said parts and rigidly engageable by the other thereof to releasably hold said body in position when it is forwardly tilted on its axis in said frame to effect the described operation of loading. To constitute these means, a bar C may be pivoted or hinged, as by a stud $c$, on the outward side of each of the side walls $a$ at about the forward edge of the front incline $a'$ of the bottom of the body, and said bars may be releasably engaged to the frame B by pins $c'$, passed transversely through said frame and bars, as shown. These pins may be conveniently suspended on the frame by short chains $c^2$, and sockets or staples $c^3$ may be provided on the frame to seat the pins when they are not in use. The upper ends of said bars C may be furnished with handles $c^4$ to serve as a means for raising the forward end of the body when the body is upwardly tilted to bring it into position in the frame for draft, as shown in Fig. 1, and when the body is in said position the bars C may be conveniently swung rearwardly on their pivots and allowed to rest in brackets $c^5$ on the outside of the walls $a$, as shown.

It is desirable that the front edge of the inclined portion $a'$ of the bottom of the body should be capable of being held very close to the ground—as, for example, when the cart is drawn over an asphalt pavement in gathering a load of snow—and should also be capable of being held at some little distance above the ground-level—as, for example, when gathering a load from a rough or uneven surface, such as a stone street-pavement. To meet these requirements, I provide the devices which rigidly hold the body in its described forwardly-tilted position in the frame with means to adjustably sustain the body in said position in the frame. These means may be economically provided by forming a series of two or more pin-holes $c^6$ in the bars C, so that the pins $c'$ may be seated in either of said holes, as desired.

I further provide means carried by the body A and frame B to releasably coengage when the body is in position in the frame for draft, as in Fig. 1, and these means may be constituted of the described studs $c$, preferably sleeved on the body, and spring-controlled levers D D, fulcrumed on the frame and each having a latch-arm $d$ to engage one of said studs and actuated to vibrate them against their springs to withdraw the said latch-arms from said studs by a rod $d'$, common and pivotally connected to the other arms $d^2$ of said levers, and which rod is operated by a lever $D'$, connected therewith and desirably fulcrumed to the seat E in convenient reach of the driver.

The gate $a^4$ or hinged lid $a^3$, as the case may be, is desirably provided with a latch device $a^5$, which may be in the form of the well-known bucket-latch, which after disengagement is automatically reëngageable and which may be operated to effect disengagement by a chain and rod $a^6$ within reach of the driver, as shown.

When the described cart reaches the dump, it may be quickly emptied by disengaging the latch $a^5$ to permit the gate or lid to open and by throwing the lever $D'$ to effect the withdrawal of the latches $d$ from the studs $c$, thereby permitting the body to tilt entirely backward in the frame, as illustrated in Fig. 4, and dump its load. The body may then be again tilted forwardly downward and restored to the position for draft, as in Fig. 1, and upon again reaching the place of loading the body may be again tilted forward and held in position, as illustrated in Fig. 2.

What I claim as my invention, and desire to secure by Letters Patent, is—

1. In a cart the combination with the frame, its supporting-axle and wheels, of a body pivotally mounted on the axle within the frame and provided with a bottom the forward portion of which is inclined between its rearward portion and the open front end of said body, together with means carried by said body and said frame to releasably and rigidly coengage when said body is forwardly tilted in said frame.

2. In a cart the combination with the frame, its supporting-axle and wheels, of a body pivotally mounted on the axle within the frame and provided with a bottom the forward portion of which is inclined between its rearward portion and the open front end of said body, together with a rigid connection carried by the body and reaching to said frame when said body is forwardly tilted therein, and means carried by said frame to releasably engage said rigid connection.

3. In a cart the combination with the frame, its supporting-axle and wheels, of a body pivotally mounted on the axle within the frame and provided with a bottom the forward portion of which is inclined between its rearward portion and the front open end of said body, together with bars respectively pivoted on the sides of said body at its forward end and reaching to said frame when said body is forwardly tilted therein, and pins carried by said frame to seat through the same into apertures, one or more, in said bars.

4. In a cart the combination with the frame, its supporting-axle and wheels, of a body pivotally mounted on the axle within the frame and composed of side walls, a covered top, and a bottom the rearward portion of which is approximately parallel to said top, and the forward portion of which is inclined between said rearward portion and the front open end of said body, together with a hinged gate to close the rear end thereof.

5. In a cart the combination with the frame, its supporting-axle and wheels, of a body pivotally mounted on the axle within the frame and provided with a bottom the forward portion of which is inclined between its rearward portion and the open front end of said body, together with means carried by said body and said frame to releasably and rigidly coengage when said body is forwardly tilted in said frame, and further means carried by said body and said frame to releasably lock said body to said frame when the body is horizontally poised in the frame.

FREDERICK C. WEBER.

Witnesses:
ARDEN S. FITCH,
WM. H. BISHOP.